May 11, 1965

R. L. HENRY 3,183,397

MOTOR CONTROL APPARATUS

Filed Feb. 28, 1963

INVENTOR.
ROBERT L. HENRY
BY
*Howard A. Keiser*
*& Jack J. Earl*
ATTORNEYS 3,183,397
MOTOR CONTROL APPARATUS
Robert L. Henry, Cincinnati, Ohio, assignor to The Cincinnati Milling Machine Co., Cincinnati, Ohio, a corporation of Ohio
Filed Feb. 28, 1963, Ser. No. 261,650
3 Claims. (Cl. 314—71)

This invention to a voltage sensitive motor control mechanism of the type which is particularly adapted to operate a reversible motor and thereby to maintain an electrode in close proximity to a workpiece during an electrical machining operation.

In an electrical machining operation such as electrical discharge machining, sometimes referred to as spark machining, the cutting electrode must be maintained at a nearly constant distance away from the workpiece which is being operated upon. This holds the voltage across the gap between the electrode tool and workpiece at a corresponding constant voltage which is selected to produce the best cutting speed for the operation with an acceptable surface finish. It is a common practice to set a rate of operation for the feed motor to match the rate of metal removal or erosion from the workpiece and electrode which will tend to maintain the gap distance constant. Many variables are present which cause the erosion rate to change periodically. Consequently, it is also a common practice to provide a gap voltage sensitive circuit to interrupt and reverse the feed of the electrode when the gap becomes too small and particularly when the electrode and workpiece are shorted together or when an arcing condition occurs rather than a sparking condition.

It is an object of this invention to provide a simplified gap voltage monitoring circuit in an electrical machining apparatus which will respond to alter the tool feed when the tool and workpiece spacing is less than a preset distance.

It is also an object of this invention to provide a simple and inexpensive control circuit for a motor which operates to stop or reverse the operation of the motor in response to a varying voltage signal occurring as the result of changes in conditions external of the motor.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the preferred form, this invention utilizes a polarized relay across which a preset reference voltage and the gap voltage in an electrical machining apparatus are compared. When the gap voltage exceeds the reference voltage, a circuit is completed by the relay to operate an electric feed motor in one direction. When the gap voltage is approximately equal to the reference voltage, the relay operates to stop the motor and if the gap voltage drops below the reference voltage, the relay reverses the power connection to the motor, and it is operated in the reverse direction.

A clear understanding of the construction and operation of this invention can be obtained from the following detailed description in which reference is made to the attached drawings wherein.

Figure 2:
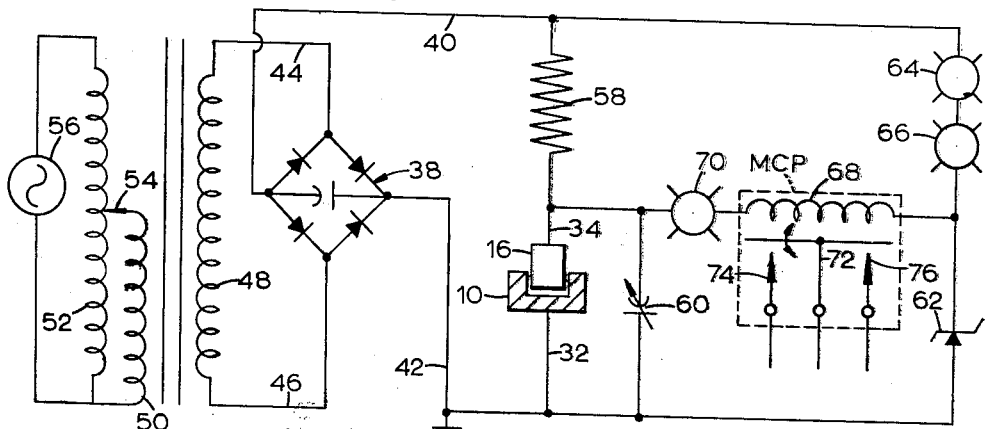
FIG. 2 is a schematic showing of a gap power supply and feed motor control circuit for a spark machining apparatus.
Figure 1:
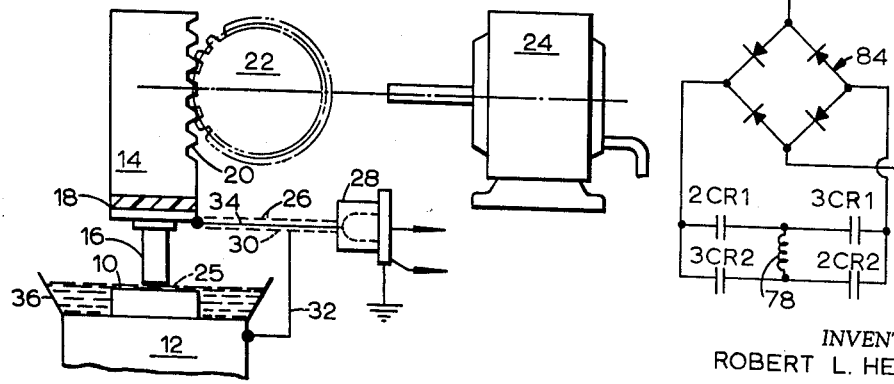
FIG. 1 is a simplified representation of an electric machining apparatus.

In the apparatus of FIG. 1, a workpiece 10 is supported on and in electrical contact with a worktable 12. The workpiece 10 is located below a machine quill 14 in which a tool electrode 16 is mounted and held in electrical isolation from the rest of the machine by an insulating member 18. The quill 14 has a toothed rack 20 formed thereon and the rack 20 is engaged by a pinion 22 which is driven by a reversible electric motor 24 for movement of the electrode 16 toward and away from the workpiece 10 to maintain a small gap 25 therebetween. The machine described is an electrical discharge apparatus and the spark producing power is connected between the tool electrode 16 and the table 12 by means of a shielded cable 26 extending from the machine to a power plug 28 at the machine power package unit. The shield 30 of the cable 26 is connected to common potential or ground and to the worktable 12 by a conductor 32 while a conductor 34 within the cable 26 is connected to the tool electrode 16 and to a source of negative potential to be described with reference to FIG. 2. Thus the electrode 16 is cathodic while the worktable 12 is anodic. In order to enhance the sparking characteristics across the gap 25 and to wash away dislodged metal particles, the workpiece 10 is immersed in a dielectric fluid contained in the tank 36. Appartus of this general nature is well known in the metal working art.

The direct current potential applied across the gap 25 is obtained from a full wave diode bridge rectifier circuit 38. The rectifier 38 supplies the direct current power to a pair of conductors 40 and 42, the latter being connected to the common reference potential. The alternating current which is rectified in the circuit 38 is supplied to a pair of energizing leads 44, 46 by a transformer source which includes a secondary winding 48, a primary winding 50 and an autotransformer 52 to which the primary winding 50 is adjustably connected by means of a wiper connection 54. The auto-transformer 52 is energized from a source of alternating current 56. The sparking action across the gap 25 is produced by a resistance capacitance network including a resistance 58 and a variable capacitor 60 connected between the power lines 40 and 42. The setting of the wiper contact 54 controls the peak gap voltage while the adjustment of the capacitor 60 regulates the spark rate. Spark machining power supplies of this type also are well known in construction and operation in the metalworking industry.

A reference potential against which the gap potential is compared is produced in a circuit which includes a Zener diode 62 in series with a pair of low wattage lamps 64, 66 connected across the direct current power lines 40, 42. The Zener diode 62 has a predetermined reverse bias breakdown point, and it operates to produce a constant voltage drop in the current path including the lamps 64, 66. The lamps 64, 66 establish a substantially constant reverse current through the diode 62 despite voltage changes across the power lines 40, 42. As the voltage across the lines 40, 42 changes, the bulbs 64, 66 change their resistance correspondingly due to changes in filament temperature, and this compensates for the varying voltage across the power lines 40, 42 while the voltage across the diode 62 remains unchanged. The current through the bulbs 64, 66 then produces the constant reference voltage across the diode 62. This reference voltage is connected to one end of an energizing coil 68 of a polarized relay MCP. The other end of the coil 68 is connected to one side of a low wattage lamp 70 whose other side is connected directly to the lead 34 which connects negative potential to the tool electrode 16. It can be seen that when there is no potential difference between the voltage at the electrode 16 and the reference voltage across the diode 62, no current will flow through the coil 68. When there is a difference, a current will flow in a direction dependent upon the direction of the difference or its polarity. The current which does flow is limited to a proper level by the lamp 70 even though the voltage difference varies between wide limits. When the voltage difference is small, the resistance of the bulb 70 is small and when the difference becomes large, the resistance of the bulb 70 increases to limit the current through it. Thus, it can be seen that the bulb 70 does not adversely affect the sensitivity of the polarized relay MCP when the difference between the gap voltage and reference voltage is small but when the difference is large, the relay MCP is protected from excessive current.

The coil 68 operates a single pole double throw, center off, switching mechanism of the relay MCP which includes a movable pole 72 and a pair of contacts 74, 76. When the coil 68 is not energized by a current flow, the pole 72 does not make contact with either of the contacts 74, 76, but when the potential at the electrode 16 is above the reference voltage across the diode 62 the pole 72 swings to engage the contact 74 to complete a circuit therethrough due to the current flow through the coil 68. When the voltage at the electrode 16 falls below the reference voltage across the diode 62 the current flow through the coil is reversed and the pole 72 is swung to engage the contact 76 and to complete a circuit therethrough. A relay of the polarized type illustrated is shown and described in detail in U.S. Patent 2,443,784, issued June 22, 1948, upon an application filed by Clark V. Bullen and Carl J. Anderson.

In the illustrated example, assume that the normal gap voltage is set by the contact 54 to be at 65 volts and that the reference voltage across the diode 62 is 22 volts. While the mechanism is operating to feed the electrode 16 downward in a normal desired manner, the poles 72 will engage the contact 74. If the gap voltage drops to about 23 or 24 volts due to sustained arcing conditions produced by an excessive reduction of the gap 25 or to other variable within the gap, such as the lodging of chips therein, the current flow through the coil 68 stops and the pole 72 assumes its center open position. Should the gap voltage fall below the level of 21 or 20 volts due to increased arcing or a short circuit between the electrode 16 and the workpiece 10, the pole 72 will swing to engage the contact 76. Thus, the pole 72 is caused to assume one of three positions in response to the gap voltage.

Figure 3:
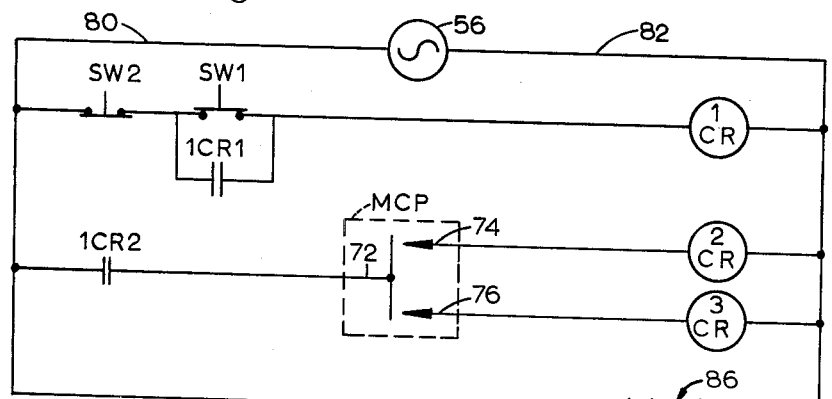
FIG. 3 is a schematic machine control circuit for the machine of FIG. 1 operated in response to the circuit elements of FIG. 2.

The operation of the electric feed motor 24 is controlled by the condition of the pole 72 as shown in the control circuit diagram of FIG. 3. Operation of the motor 24 produced by the energization of its armature winding 78 and the direction of its operation is determined by the polarity of that winding. The source 56 is connected across the power lines 80, 82 to provide the power for control relay operation and for energization of the winding 78. To start the feed motor 24, the start switch SW1 is momentarily closed to energize the relay 1CR which closes its contacts 1CR1 to latch in the energized condition until the switch SW2 is momentarily opened to stop the motor 24. The contacts 1CR2 are also closed at this same time to apply power to the pole 72 of the polarized relay mechanism MCP. The gap voltage at this starting time is above the reference voltage across the diode 62, assuming that the quill 14 has been retracted prior to starting the feed. Therefore the pole 72 will be swung to engage the contact 74 and the relay 2CR is then energized. The contacts 2CR1 and 2CR2 are closed and a direct current of a predetermined polarity is applied across the winding 78 from a full wave diode rectifier 84 energized from the power lines 80, 82. The motor 24 operates now to shift the quill 14 downward to carry the electrode 16 toward the workpiece 10. The potential across the winding 78 is adjustable by means of a rheostat 86 to set a selected rate of operation of the motor 24. If the gap voltage drops to the level of the reference voltage across the diode 62, the pole 72 swings to its center position, and the relay 2CR is deenergized and its contacts 2CR1 and 2CR2 open and the winding 78 is deenergized to stop the motor 24. Should the gap be shorted and the voltage thereacross drop below the reference level, the pole 72 makes with the contact 76, and the relay 3CR is energized to close its contacts 3CR1 and 3CR2 to apply the energizing potential across the winding 78 to reverse the motor operation and move the electrode 16 away from the workpiece until the gap voltage again rises to or above the reference level. It can be seen from this that the polarized relay MCP will operate to produce an automatic feed of the electrode toward the workpiece and to stop and reverse the feed automatically when the electrical conditions at the gap fall below preset minimum standards.

While the invention has been described in connection with one possible form or embodiment thereof, it is to be understood that the present disclosure is illustrative rather than restrictive and that changes and modifications may be resorted to without departing from the spirit of the invention or the scope of the claims which follow.

What is claimed is:
1. In an electrical machining apparatus having a reversibly operable motor connected to shift a tool electrode of one potential toward and away from a workpiece defining a second electrode of another potential to maintain a close spacing therebetween during a machining operation and a machining operation and a source of electrical power, a control apparatus responsive to the potential difference across the space between said electrodes to operate the motor comprising in combination:
   (a) a current conducting path connected to said second electrode and across the source and including
      (1) a Zener diode and
      (2) a variable resistance device in series with said Zener diode having a resistance changing to compensate for variations in potential of the source whereby the junction point between the Zener diode and variable resistance remains at a constant reference potential with respect to said second electrode,
   (b) a polarized relay having
      (1) an energizing coil connected in circuit between said junction point and the tool electrode,
      (2) a pole member movable from a center position one way and the other in accordance with the direction of current flow in said energizing coil, and
   (c) means for energizing the motor to move said tool electrode toward and away from the second electrode when said pole member is moved from the center position thereof one way and the other, respectively.
2. The control apparatus of claim 1 wherein:
   (a) a variable resistance device is included in series with said energizing coil and has a resistance proportional to the difference in potential between said junction point and the tool electrode to limit current flow through said energizing coil.
3. The control apparatus of claim 2 wherein:
   (a) each of said variable resistance devices in series with said Zener diode and said energizing coil has an electrical resistance directly proportional to temperature and the temperature of each increases with an increase in electrical energy conducted therethrough.

References Cited by the Examiner
UNITED STATES PATENTS 2,875,368  2/59  Jones et al. _____ 314—74
2,984,761  5/61  Webb _____ 314—69 X

OTHER REFERENCES

"Semiconductor Devices," Turner, pages 48 and 49 relied on, TK 7872 S4T8.

RICHARD M. WOOD, *Primary Examiner.*
JOSEPH V. TRUHE, *Examiner.*